C. A. ROSS

VALVE

Filed March 5, 1921

Inventor
Charles A. Ross,
By
Attorneys

Patented Mar. 11, 1924.

1,486,304

UNITED STATES PATENT OFFICE.

CHARLES A. ROSS, OF DETROIT, MICHIGAN.

VALVE.

Application filed March 5, 1921. Serial No. 449,707.

*To all whom it may concern:*

Be it known that I, CHARLES A. ROSS, a citizen of the United States of America, residing at Detroit, in the county of Wayne and State of Michigan, have invented certain new and useful Improvements in Valves, of which the following is a specification, reference being had therein to the accompanying drawings.

This invention relates to valves that may be advantageously used for controlling fluids and liquids, under pressure, particularly air utilized as a motive fluid or prime mover, for instance, in a cylinder for moving a piston therein to accomplish work. Such valves are ordinarily known as "two, three and four-way valves" and include an arrangement of ports by which one end of a cylinder may exhaust and the opposite end of the cylinder receive a charge of air to move the piston in one direction;—this being generally accomplished by a single operation of the valve and a reverse operation either causes a cessation in the movement of the piston, or a reverse movement of the piston. Many such valves require considerable piping; constant attention during an operation, and due to the arrangement of parts an expensive and intricate valve body and mechanism. Then again such valves will leak and require almost continual packing to remain serviceable.

My invention aims to provide a valve of the above type that will be positive and reliable in its action, free from injury by ordinary use, easy to maintain tight against leakage, simple to operate, and comparatively inexpensive to manufacture. The valve possesses many novel features that may be characterized as follows:—

First, there is a one piece valve body having intake, exhaust and atmospheric ports, channels and chambers that permit of the valve body being cast and with little machining placed in condition for valves and connections.

Second, there is co-operation between the packing means for the valves and the valve operating means which permits the latter to actuate or increase the packing proclivities of the former. This is brought about by using spring pressed glands or packing members in the stuffing boxes through which the reciprocable valve rods or stems extend, and when the valve rods are actuated to open the valves, the springs on the glands are stressed or placed under additional tension, thereby insuring a tighter packing when the valves are open than when closed, the closed valvular condition more or less preventing leakage about the valve rods or stems. Since the packing means is automatically stressed during the charging of a cylinder, there is no danger of a cylinder being but partially charged due to leakage at the valve rods.

Third, the valve operating means previously mentioned includes a spring pressed walking beam by which a plurality of valve rods may be depressed, and an oscillatory operating lever by which valve rods may be selectively operated. For the purposes of my invention the valve rods have been disposed to be actuated in sets and the relation between the walking beam and its operating lever is such that either set of valves may be positively operated and held in an open position, without any danger of the valves closing or moving due to air pressure. This is brought about by a defined action of the operating lever relative to the walking beam, and more particularly by the shape of the walking beam, it being shaped to automatically and positively hold the operating lever in a set position until intentionally and manually readjusted. This feature of my invention, in its broadest aspect, involves two fulcrumed members, one actuated by the other, to assume angular relation with pressure against the actuated member holding the other member in its set position.

The above and other features of my invention will be more fully explained hereinafter by aid of the drawings prepared from blue prints of a valve which has been fully tested and found satisfactory. In the drawings:—

Figure 1:
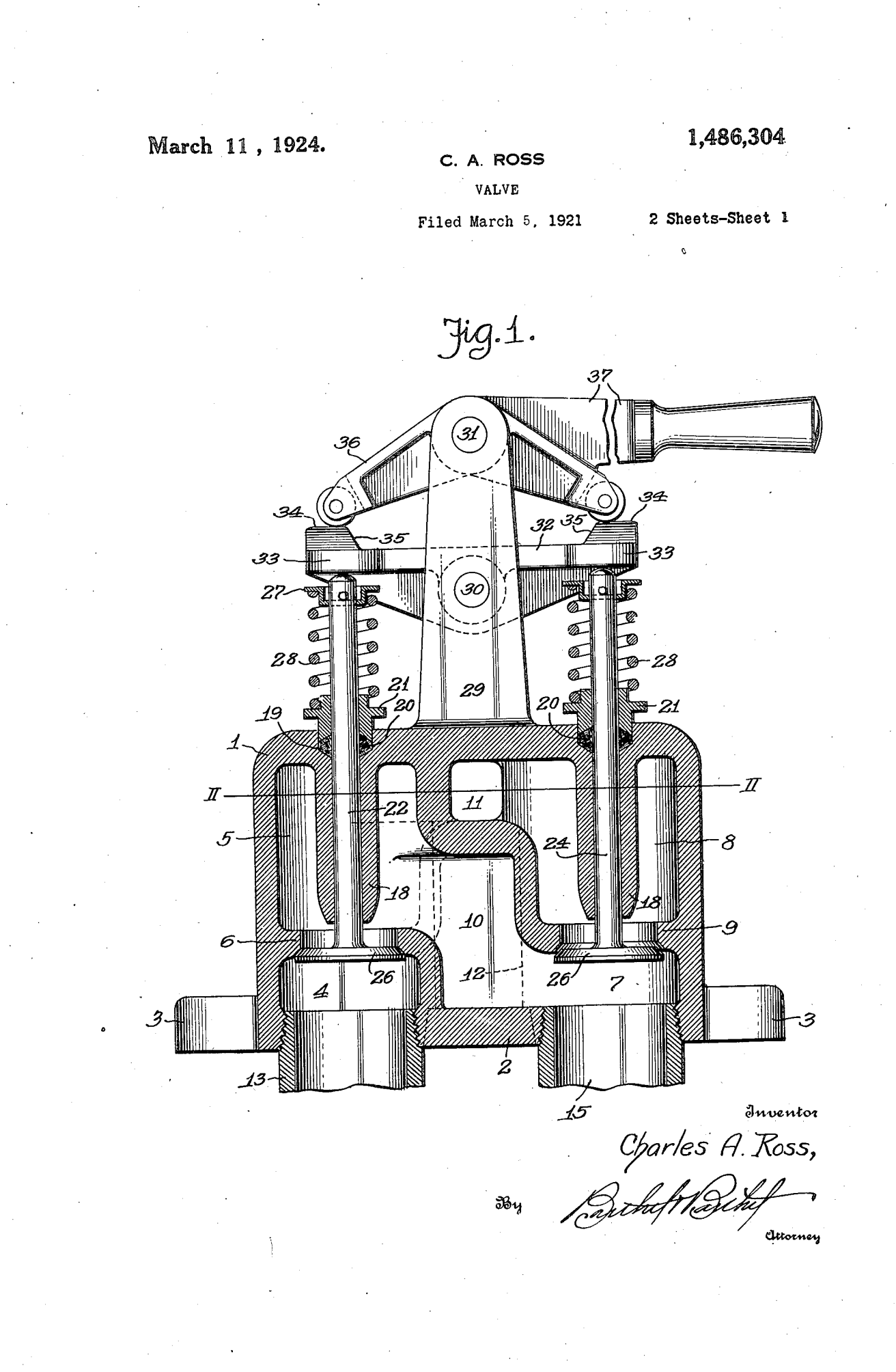

Figure 1 is a vertical longitudinal section of the valve showing its normal position;

Figure 2:
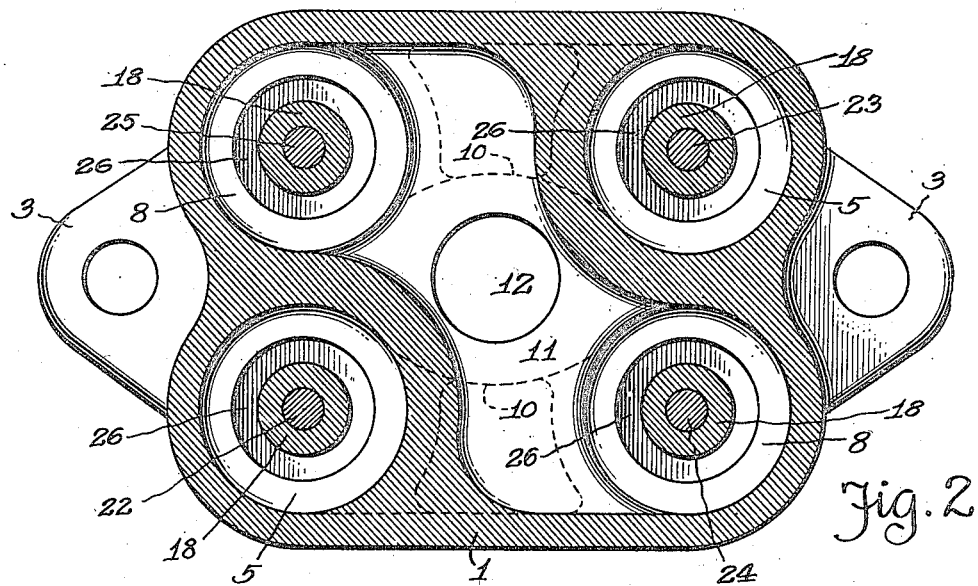
Fig. 2 is a horizontal section taken on the line II—II of Fig. 1.
Figure 3:
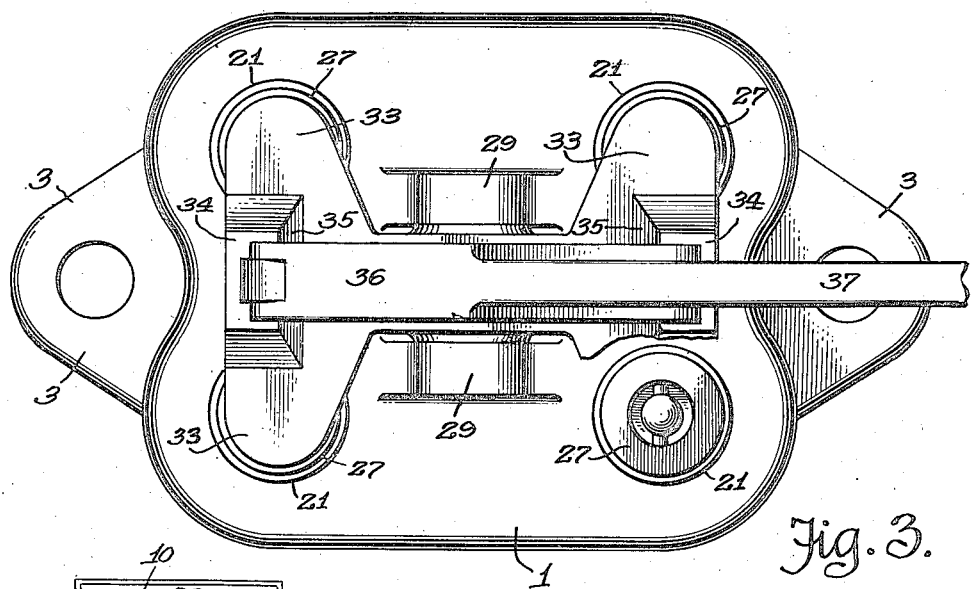
Fig. 3 is a plan of the valve.
Figure 4:
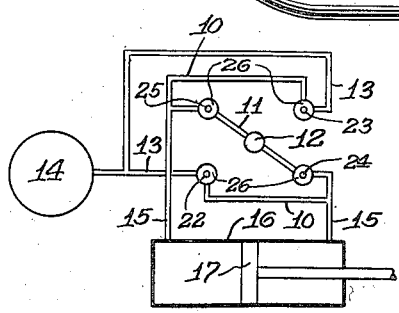
Fig. 4 is a diagrammatic view of the valve associated with a cylinder to assist in understanding one of its uses and operation.

The valve comprises a substantially rectangular body 1 having what may be considered the base or bottom 2 thereof provided with lateral apertured lugs 3 so that the valve body may be secured to a suitable support, if necessary, for in some instances the valve body may be supported by pipes connected thereto, as will hereinafter appear.

The interior of the valve body is partitioned to form various chambers, passages and ports. In diagonally opposed corners or end portions of the valve body are lower intake chambers 4 and upper intake chambers 5, the chambers in each end portion of the valve body being separated by a ported partition 6 affording a valve seat.

Other diagonally opposed corners or end portions of the valve body have lower exhaust chambers 7 and upper exhaust chambers 8, said chambers at each end portion of the valve body being separated by a ported partition 9 affording a valve seat. The upper intake chambers 5 communicate with the lower exhaust chambers 7 by passages 10, and the upper exhaust chambers 8 communicate with each other by a horizontally disposed passage 11 communicating with a central exhaust port 12 extending through the passage 11 in the upper portion of the valve body to the base of the valve body where it communicates with the atmosphere.

The lower intake chambers 4 communicate with intake pipes 13 leading to a suitable source of air under pressure, for instance a reservoir or air compressor 14.

The lower exhaust chambers 7 communicate with cylinder pipes 15 leading to the ends of a cylinder 16 containing a piston 17, said cylinder and piston representing means of utilizing air, under pressure, to perform work. The pipes 13 and 15 may constitute supporting means for the valve body in lieu of the lugs 3.

Extending into the upper intake and exhaust chambers 5 and 8 respectively, are valve rod guides 18 having the upper ends thereof recessed or provided with stuffing boxes 19 containing a compressible packing 20 and packing glands or members 21. Extending through the valve guides, stuffing boxes and glands, are intake valve rods 22 and 23, and exhaust valve rods 24 and 25, all of said valve rods having the lower ends thereof provided with valves 26 adapted to seat on the partitions 6 and 9 and close the lower intake and exhaust chambers relative to the upper intake and exhaust chambers. These valves open into the chambers 4 and 7 when the valve rods are depressed.

Suitably mounted on the outer ends of the valve rods 22 to 25 inclusive are spring retaining members or washers 27 and encircling the outer ends of said valve rods, between the retaining members 27 and the glands 21 are coiled expansion springs 28 constituting expansion means for maintaining the valves 26 closed or approximately so. These springs also serve to compress the packing 20 within the stuffing boxes 19, especially when the valves are fully open, and this is a feature of my invention to which I attach considerable importance as leakage about the valve rods is nil or reduced to a minimum.

On the top of the valve body 1 is a set of bearings 29 connected by pins 30 and 31. On the pin 30 is fulcrumed a walking beam 32 substantially H-shaped in plan, said walking beam having arms 33 extending over the upper ends of the valve rods 22 to 25 inclusive with the upper face of the walking beam provided with end abutments 34. Each abutment affords a horizontal bearing surface and an angularly disposed holding face 35. The walking beam is normally maintained in a horizontal position by the expansive force of the springs 28 and the exhaust valve rods 24 and 25 are proportioned relative to the intake valve rods 22 and 23 so that the exhaust valves will be held partially open. The open position of one of these exhaust valves in Fig. 1 has been exaggerated, but it will be understood that the opening is simply sufficient to afford what may be considered "a bleeding port," so that no air will be retained in either end of the cylinder 16 when the valve is in neutral position. This will permit of a positive or full stroke action of the piston 17 in the cylinder 16.

Fulcrumed on the pin 31 of the bearings 29 is a rocker member 36 forming part of an operating lever 37, and the ends of the rocker member 36 engage the abutments 34 at the ends of the walking beam 32. The horizontal position of the walking beam 32 retains the rocker member 36 and its operating lever 37 normally horizontal.

From the foregoing it will be observed that there is a set of valves at each end of the valve body 1 and that by raising or lowering the operating lever 37 either set of valves may be operated. Assuming that the operating lever 37 is raised the walking beam 32 is rocked to depress the intake valve rod 22 and the exhaust valve rod 25. Tilting of the walking beam 32 releases the exhaust valve rod 24 so that the partially open valve thereof may close. This takes place automatically and prevents air under pressure escaping to the atmosphere, as will presently appear. When the intake valve rod 22 is depressed air under pressure from the reservoir 14 passes through the intake pipe 13 into the lower intake chamber 4, through the partition 6 into the upper intake chamber 5, through the passage 10 into the lower exhaust chamber 7, and then through the cylinder pipe 15 to one end of the cylinder 16, where the air under pressure shifts the piston 17 to perform work. The opposite end of the cylinder exhausts through the pipe 15 to the other lower exhaust chamber 7 which fully communicates with the upper exhaust chamber 8 and the atmospheric port 12 by reason of the exhaust valve rod 25 having been simultaneously depressed with the intake valve rod 22. When these two valve rods are depressed by the walking beam the springs 28 associated with said valve rods are additionally stressed so that the packing proclivities of the glands 21 are materially increased, thus insuring a tight connection about the valve rods 22 and 25 while the valves 26 thereof are opened.

Raising of the operating lever 37 places the rocker member 36 in engagement with the holding face 35 of the walking beam abutment 34 and with this holding face disposed at a right angle to the end of the rocker member, the abutment will cooperate with the pin 31 in positively holding the walking beam in its tilted position, so that air pressure against the valves 26 cannot accidentally shift said valve. In other words, there is no defined midway position for the operating lever 37 after it has once started on its movement, and the operating lever may be set to positively hold the valve so as to maintain a pressure of air in the cylinder 16.

I attach considerable importance to the fact that the valve finds its own neutral position upon being released, and no jarring or vibration can open it. In a neutral position, both ends of the cylinder are open to exhaust which permits no creeping of the piston, and this is very desirable in a pneumatic valve used as a work controlling device.

It is thought that the operation of the other valves, by lowering the operating lever 37, will be understood without rehearsing how the piston 17 may be shifted in an opposite direction than that described above, and while in the drawings there is illustrated a preferred embodiment of the valve, it is to be understood that the construction is susceptible to such changes, in size, shape and manner of assembly as fall within the scope of the appended claims.

What I claim is:—

1. The combination of valves, a member adapted to operate said valves, and an operating member adapted to actuate the first mentioned member, said members being arranged so that said members are automatically and positively held relative to each other by contact when in adjusted positions.

2. The combination set forth in claim 1 wherein the members are fulcrumed adjacent each other and the actuated member of such construction as to co-operate with the fulcrum of the operating member in positively holding said operating member in a set position.

3. The combination of valves, a walking beam adapted to be rocked to operate some of said valves in synchronism, and an operating lever adapted to be rocked to contact with either end of said walking beam and rock said beam to operate the valves.

4. The combination set forth in claim 3 wherein said walking beam is spring pressed and bears a relation to said operating lever which causes said lever to be automatically held in a set position.

5. The combination of opposed sets of valves, a walking beam common to said sets of valves and adapted to be rocked to operate either set of valves, and means adapted for rocking said walking beam by contact with said walking beam and automatically hold it in a set position.

6. The combination set forth in claim 5 characterized by said means engaging the ends of the walking beam and assuming such an angular relation thereto that said walking beam and its rocking means are simultaneously held in set positions.

7. The combination set forth in claim 5 characterized by said walking beam having end abutments, and said means constantly engaging said end abutments and maintaining one set of valves partially open.

8. The combination with a valve body, of a normally closed intake valve in said body, a normally and partially open exhaust valve in said body adapted to be fully closed when said intake valve is opened, and means adapted to alternately and fully open said valves.

9. The combination set forth in claim 8 characterized by said means including fulcrumed members one against the other, and additional means associated with said valves maintaining the intake valve closed and said members normally in position to operate either valve.

10. The combination with a valve body, of two sets of valves therein, each set comprising a closed intake valve and a partially open exhaust valve, means maintaining the valves of each set in such closed and partially open relation, and means on said means adapted to simultaneously operate a valve of each set.

11. The combination set forth in claim 10 wherein the first mentioned means includes a walking beam supported between the sets of valves and springs and valve seats cooperating with said walking beam.

12. The combination with a valve body, of four valves therein, two of which are normally closed and the remaining valves partially open, means for operating said valves, said means being constructively arranged so that one of said closed valves and one of said partially open valves may be completely opened and the other of said partially open valves closed.

13. The combination set forth in claim 12 wherein said means has a rocking movement so that three such valves as outlined in claim 12 may be selected for operation.

14. The combination of a valve body, valves in said body, and having valve rods extending out of said body, springs about said valve rods, a walking beam engaging said valve rods, one of said springs maintaining one of said valves normally closed and the other valve partially open, the other spring adapted to close said partially open valve when the other closed valve is opened, and means engaging said walking beam for effecting movement of either valve.

In testimony whereof I affix my signature in presence of two witnesses.

CHARLES A. ROSS.

Witnesses:
KARL H. BUTLER,
ANNA M. DORR.